United States Patent [19]

Kato

[11] Patent Number: 5,227,882
[45] Date of Patent: Jul. 13, 1993

[54] VIDEO DISPLAY APPARATUS INCLUDING DISPLAY DEVICE HAVING FIXED TWO-DIMENSIONAL PIXEL ARRANGEMENT

[75] Inventor: Naoki Kato, Matsudo, Japan

[73] Assignee: Sharp Kabushiki Kaisha, Osaka, Japan

[21] Appl. No.: 765,527

[22] Filed: Sep. 25, 1991

[30] Foreign Application Priority Data

Sep. 29, 1990 [JP] Japan ................... 2-261258

[51] Int. Cl.⁵ .............................. H04N 5/14
[52] U.S. Cl. ..................... 358/160; 358/148; 358/241
[58] Field of Search ............ 358/140, 230, 241, 56, 358/148, 181, 160

[56] References Cited

U.S. PATENT DOCUMENTS

| | | | |
|---|---|---|---|
| 4,571,614 | 2/1986 | Iyehara et al. | 358/56 |
| 4,651,208 | 3/1987 | Rhodes et al. | 358/140 |
| 4,694,348 | 9/1987 | Kamiya et al. | 358/241 X |
| 4,748,510 | 5/1988 | Umezawa | 358/241 X |
| 4,843,471 | 6/1989 | Yazawa | 358/160 |
| 4,853,781 | 8/1989 | Okano et al. | 358/148 |
| 4,953,025 | 8/1990 | Saitoh et al. | 358/230 X |
| 5,029,326 | 7/1991 | Tabata | 358/140 |

FOREIGN PATENT DOCUMENTS 59-214900  6/1984  Japan.
61-267469 11/1986  Japan.

*Primary Examiner*—Victor R. Kostak

[57] ABSTRACT

A video display apparatus includes an LCD device of the active matrix type and an image memory having an arrangement and storage capacity corresponding to the two-dimensional pixel arrangement thereof. A necessary processing such as conversion of the number of scanning lines, time-base companding in the horizontal direction and so on is applied to the inputted video signal according to the format thereof and then the inputted video signal is written into the two-dimensional arrangement of the image memory. The data written into the image memory is read out by a clock of a fixed frequency within a period shorter than the writing period asynchronously with the writing operation. Then, the LCD is driven by the read data and an image is displayed on the pixel arrangement.

20 Claims, 8 Drawing Sheets

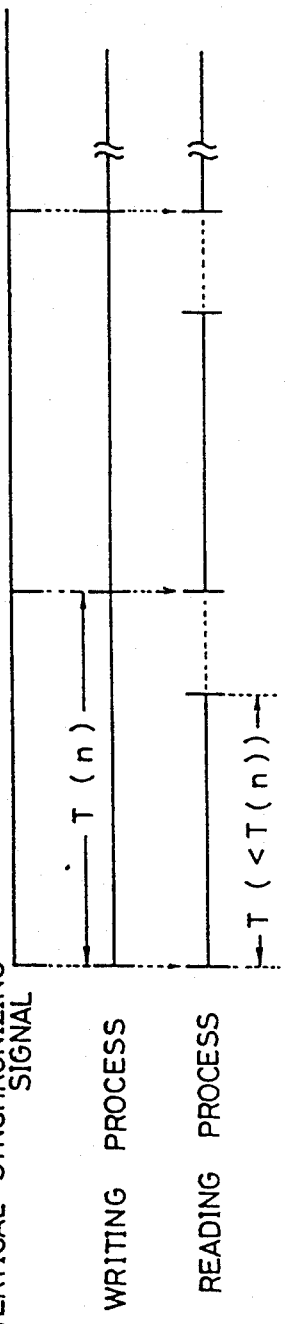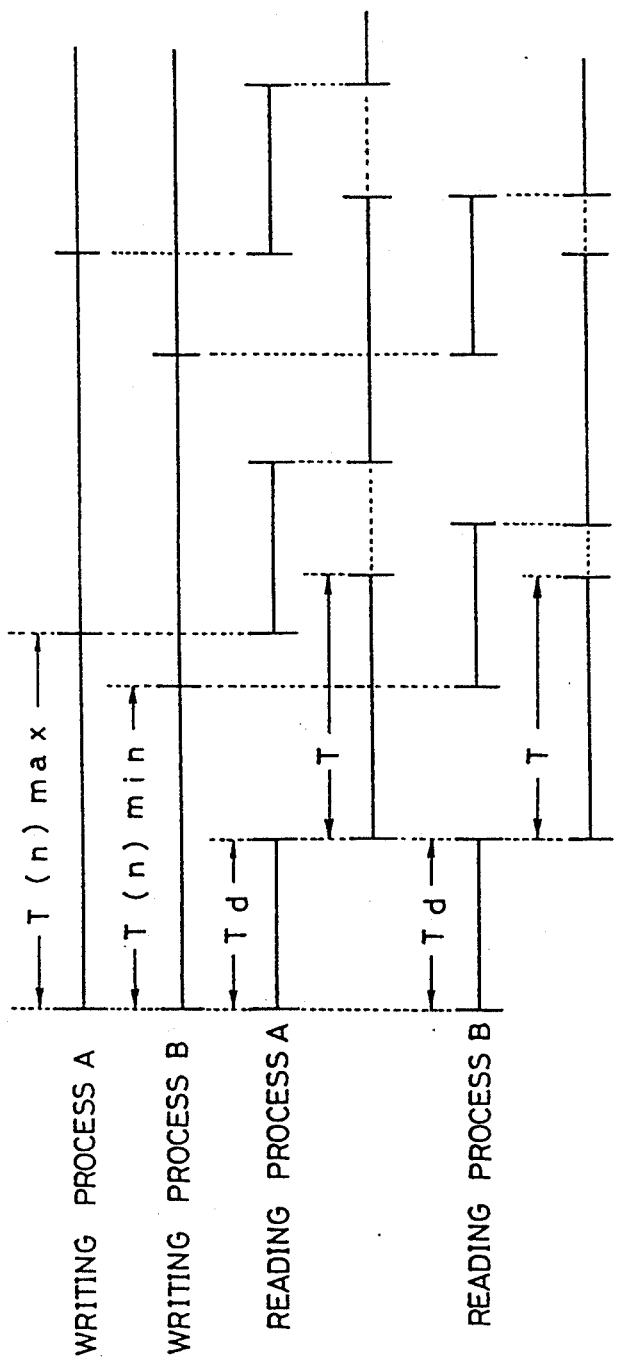
FIG. 6A
FIG. 6B

IMAGE REGION BY DUMMY PIXELS

VIDEO DISPLAY APPARATUS INCLUDING DISPLAY DEVICE HAVING FIXED TWO-DIMENSIONAL PIXEL ARRANGEMENT

BACKGROUND OF THE INVENTION

1. Field of the Invention

The present invention relates generally to video display apparatus employing a display device having a fixed two-dimensional pixel arrangement such as a liquid crystal display (LCD) device and, more particularly, relates to video display apparatus applicable to a plurality of kinds of video signals having different formats.

2. Description of the Background Art

Conventionally, a television receiver has been proposed which is capable of dealing with any one of video signals from a plurality of kinds of television systems (formats) having different factors such as horizontal and vertical synchronizing frequencies, and such television receivers are disclosed, for example, in Japanese Patent Laying-Open No. 59-104866 and Japanese Patent Laying-Open No. 61-267469.

Firstly, as an example of such receivers, consider a video display apparatus having a deflection system such as a CRT display apparatus. Generally, in a video display apparatus having a deflection system, an image is displayed on the screen by scanning with an electron beam in an horizontal direction and a vertical direction using the deflection system. That is, the video signal displayed on the screen of CRT is a continuous signal in the horizontal direction while the video signal is a discontinuous signal sampled at an interval between the scanning lines in the vertical direction and sampled at a time interval corresponding to the vertical period in the time base direction as well.

A display region of an image formed on the screen as a two-dimensional space by such a video signal is determined by the distances scanned with the beam by the deflection system in the horizontal and vertical directions in the horizontal and vertical periods, that is, the deflection size, in addition to the number of scanning lines and the horizontal and vertical periods.

Accordingly, in a case of selectively displaying video signals of a plurality of formats having different horizontal and vertical synchronizing frequencies, that is, different numbers of scanning lines (in some cases, aspect ratios) in a display apparatus having a deflection system, the display apparatus may be adapted to be able to change the horizontal and vertical frequencies in the display apparatus according to the selected format.

In this case, the difference in the number of scanning lines for each format does not particularly cause any problem for display and the difference in the aspect ratio can be coped with by suitably setting the horizontal and vertical deflection sizes. If the aspect ratios are largely different from each other, processing such as time-base companding in the horizontal direction of the video signal is required in some degree in some cases.

Conversely, in a case of a video display apparatus without a deflection system, employing a display device having the two-dimensional pixel arrangement fixed such as an LCD device, elements such as an interval between the scanning lines or the like are uniquely determined by the fixed pixel arrangement of the display device itself. Accordingly, in order to selectively display video signals of different formats on such a display device, a special counter-measure is required to solve the problem concerning the difference between the numbers of scanning lines or aspect ratios.

FIG. 1 is a block diagram showing one example of a video display apparatus for which such a counter-measure is taken. Referring to FIG. 1, the video display apparatus includes format converters 101a to 101n, a display processing unit 103, and a display unit 104 including a display device having a fixed two-dimensional pixel arrangement such as an LCD device. Signals of formats 1 to n having different horizontal and vertical frequencies are selectively provided to this video display apparatus.

Display processing unit 103 can only directly process a video signal of a specified format (in the figure, format 1) and cannot directly process signals of other formats (in the figure, formats 2 to n). Accordingly, each of the signals of these formats is converted into a signal of format 1 which display processing unit 103 can process, by a corresponding one among format converters 101a to 101n, and then supplied to display processing unit 103. Display processing unit 103 carries out processing such as drive processing of display unit 104 in response to the video signal of format 1 provided in this way.

In converting formats by each format converter, basically, it is necessary to convert the horizontal and vertical frequencies of an input video signal after considering the aspect ratio. Specifically, in format conversion, each format converter is required to carry out conversion processing of the number of scanning lines, companding processing of a video signal in the horizontal direction by considering the aspect ratio, conversion processing of the field frequency using a frame memory and so on, or the like.

In the case of the video display apparatus shown in FIG. 1, the display processing such as driving of display unit (LCD device) 104 by display processing unit 103 can be performed in a fixed manner regardless of the format of the input video signal.

However, there is a problem that a large-scale circuit structure is needed for the plurality of format converters. Furthermore, there is a problem that the timing of reading gets ahead of the timing of writing in the memory in converting a field frequency in each format converter using a finite image memory.

FIG. 2 is a block diagram showing one example of a video display apparatus for which a counter-measure different from that of the apparatus of FIG. 1 is taken. In the apparatus shown in FIG. 2, each of format converters 201a to 201n only performs conversion processing of the number of scanning lines and companding processing of a video signal in the horizontal direction considering the aspect ratio, and does not perform conversion processing of the vertical frequency, i.e., the field frequency as in the example of FIG. 1. Accordingly, the circuit scale of format converters 201a to 201n in FIG. 2 can be remarkably reduced compared with that of format converters 101a to 101n in FIG. 1.

In the video display apparatus shown in FIG. 2, however, conversion of the vertical frequency is not performed, so that the horizontal frequency of the video signal differs for each format. Accordingly, a display processing unit 203 of the apparatus of FIG. 2, unlike in the example of FIG. 1, cannot perform display processing of display unit (LCD device) 104 with one fixed format. For example, as the clock frequency employed in a driving processing system of display unit 104 differs with the format of the input video signal, display processing unit 203 must change its processing operation for each input video signal, and a problem results in that the circuit structure and the processing operation thereof are made complicated.

SUMMARY OF THE INVENTION

Therefore, an object of the present invention is to provide a video display apparatus capable of dealing with any one of video signals of different formats with a simplified structure.

Another object of the present invention is to provide a video display apparatus capable of performing display processing of a display device in a fixed manner regardless of the format of an input video signal.

Still another object of the present invention is to provide a video display apparatus in which an effective video display region can be located on a two-dimensional pixel arrangement of a display device without the reading operation getting ahead of the writing operation of an image memory.

In short, the present invention is intended for a video display apparatus including a display device, an image memory, an input terminal for receiving a video signal to be displayed, a synchronizing signal separation circuit, a clock generating circuit, a video processing and write processing unit, a fixed clock generating circuit, a read and display processing unit, and a display device driving circuit. The display device has a fixed two-dimensional pixel arrangement. The image memory is capable of storing video signals with a two-dimensional arrangement corresponding to the two-dimensional pixel arrangement of the display device and is also capable of asynchronous writing and reading operations. The synchronizing signal separation circuit extracts horizontal and vertical synchronizing signals from the received video signal. The clock generating circuit generates at least one kind of clock in phase synchronization with the extracted horizontal synchronizing signal and has a frequency selected according to the format of the received video signal. The video processing and write processing unit processes the received video signal in response to the clock and writes the video signal into the image memory so that an effective display region of the video signal is located within the two-dimensional arrangement of the image memory. The fixed clock generating circuit generates a clock of a fixed frequency. The read and display processing unit is triggered by the extracted vertical synchronizing signal and reads out the contents of the image memory within a fixed period in response to the clock of the fixed frequency in an asynchronous manner with the writing operation. The display device driving circuit drives the display device so as to display an image on the two-dimensional pixel arrangement of the display device according to the read out contents of the image memory.

According to another aspect of the present invention, the fixed period in which the contents of the image memory are read out is set shorter than the shortest one among the vertical periods of the video signals having the plurality of formats.

Accordingly, the principal advantage of the present invention is that a read processing of a video signal from the image memory and a display processing of the display device can be performed in a fixed manner regardless of the format of the input video signal, and moreover, the circuit structure of the video display apparatus can be simplified.

Another advantage of the present invention is that an effective video display region can be located on a two-dimensional pixel arrangement of the display device without the reading operation getting ahead of the writing operation of the image memory by setting a fixed period in which the contents of the image memory are read out shorter than the vertical period of an input video signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B are timing charts showing the writing and reading operations into/from the image memory.

DESCRIPTION OF THE PREFERRED EMBODIMENTS

Figure 1:
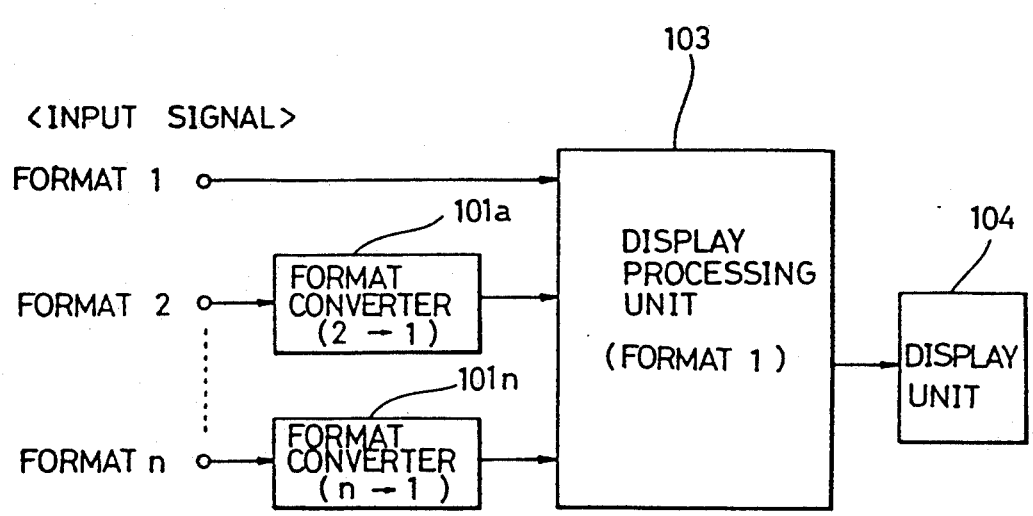
FIG. 1 is a block diagram showing one example of a conventional video display apparatus.
Figure 2:
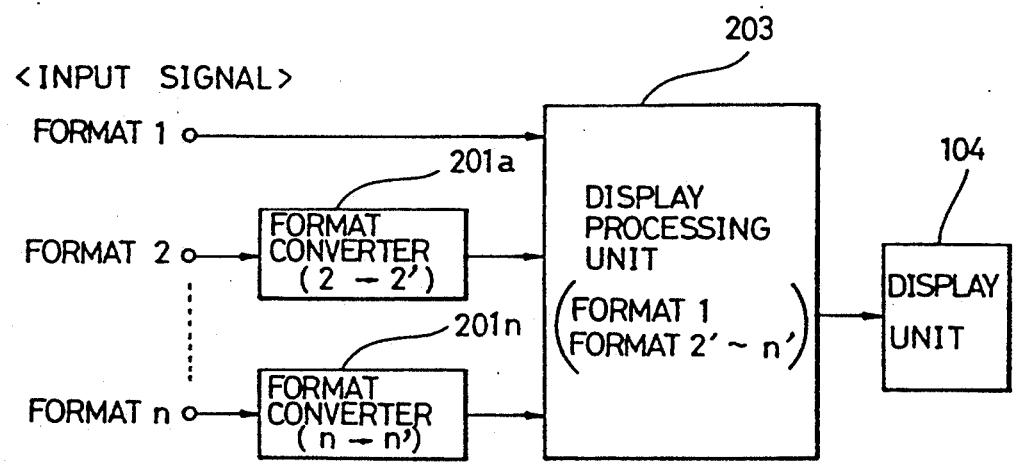
FIG. 2 is a block diagram showing another example of the conventional video display apparatus.
Figure 3:
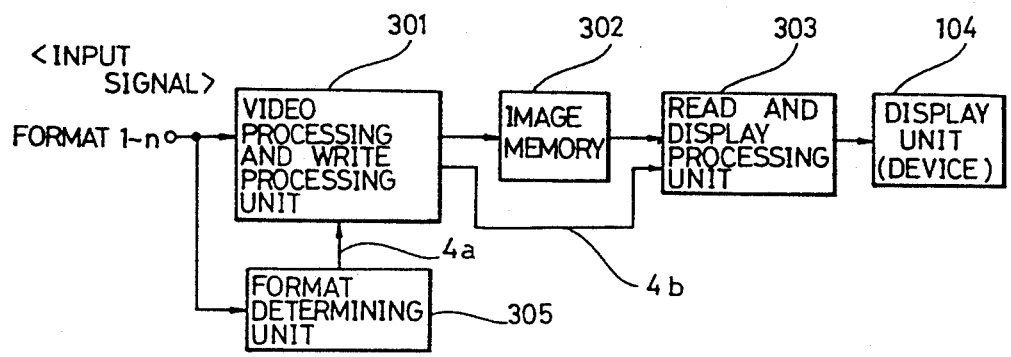
FIG. 3 is a block diagram showing the whole of a video display apparatus according to one embodiment of the present invention.

FIG. 3 is a block diagram showing a video display apparatus according to one embodiment of the present invention. Referring to FIG. 3, any of video signals of formats 1 to n is selectively provided to the input terminal of this video display apparatus. Various kinds of signals are supplied as input video signals of the different formats, such as NTSC signals, high definition television (HDTV) signals, some kinds of output video signals from a computer and so on as will be described later. Some cases may be considered where R, G, B signals are treated or where a luminance signal Y and two kinds of color difference signals are treated as video components of the input video signals.

The input video signal of a certain format is provided to a video processing and write processing unit 301 as well as to a format determining unit 305. Format determining unit 305, for example, separates horizontal and vertical synchronizing signals from the input video signal, detects the number of horizontal synchronizing signals contained in one vertical period, and furthermore, identifies a format of the input video signal based on the detected number of horizontal synchronizing signals. The format identification information 4a indicating the result of this format identification is supplied to video processing and write processing unit 301. If it is so adapted that an input terminal is provided for each signal of each format in video processing and write processing unit 301, and the format designating information indicating the format of the selected video signal is externally (by an operator) applied to video processing and write processing unit 301, format determining unit 305 of FIG. 3 is not required any more.

Video processing and write processing unit 301 applies a necessary processing to the input video signal based on the above-mentioned format identifying information and then performs writing into an image memory 302. Video processing and write processing unit 301 will be described later in detail.

Image memory 302 has a storage capacity where a two-dimensional data arrangement can be constituted, corresponding to the fixed two-dimensional pixel arrangement of display unit 104 including a display device such as an LCD, and basically one image memory is provided for each component of the input video signal. It is assumed that the operation of writing into each image memory and the operation of reading therefrom can be performed in an asynchronous manner.

Video data from video processing and write processing unit 301 is once arranged within the fixed two-dimensional space in image memory 302, and thereafter, is read out by a read and display processing unit 303. The reading is initiated by a vertical synchronizing signal 4b in the input video signal supplied from video processing and write processing unit 301 and performed for a fixed period of time by a clock of a fixed frequency. Read and display processing unit 303 further drives display unit 104 based on the video data read out from image memory 302, so that a corresponding image is displayed on the two-dimensional pixel arrangement of the display device (LCD). The read and display processing unit 303 will be later described in detail.

Figure 4:
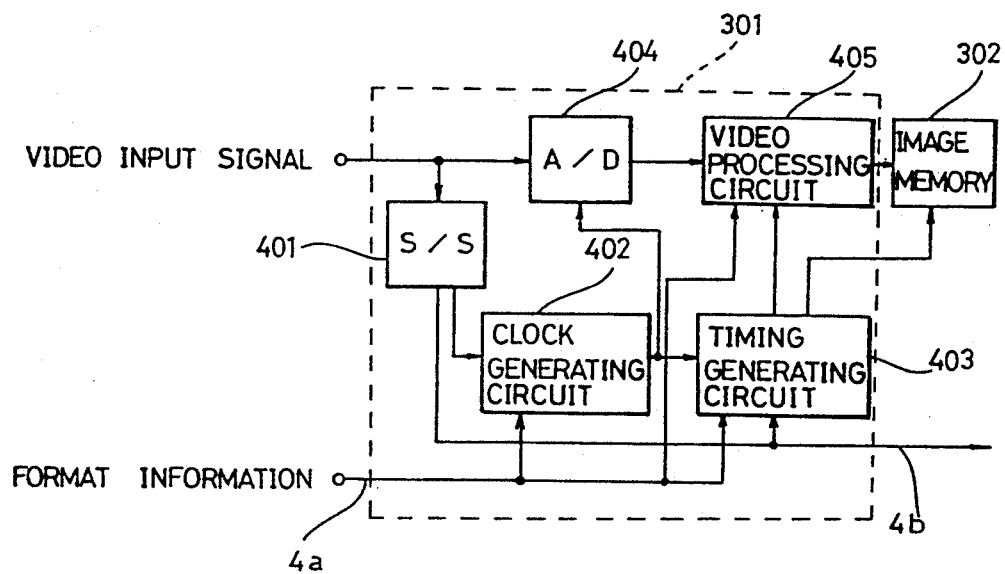
FIG. 4 is a block diagram showing the details of the video processing and write processing unit shown in FIG. 3.

FIG. 4 is a block diagram showing the details of video processing and write processing unit 301 shown in FIG. 3. Referring to FIG. 4, an input video signal of a certain format is supplied to a synchronization separation circuit 401 and horizontal and vertical synchronizing signals are extracted. The extracted horizontal synchronizing signal is provided to a clock generating circuit 402 and clock generating circuit 402 generates a clock having a phase synchronous with that of the horizontal synchronizing signal, for dividing one horizontal period into a number corresponding to an appropriate number of pixels, for each signal of each format, and provides the clock to a timing generating circuit 403. The vertical synchronizing signal 4b extracted by synchronization separation circuit 401 is supplied to timing generating circuit 403 and supplied to read and display processing unit 303 as a timing signal for controlling the timing of the start of processing in read and display processing unit 303 of FIG. 3 at the same time.

Referring to FIG. 4, the input video signal is also supplied to a video processing circuit 405 after being A/D converted by an A/D converter 404. Video processing circuit 405 applies processing adapted for the two-dimensional data arrangement in image memory 302 such as a processing of converting the number of scanning lines, a video compression processing in the horizontal direction and so on to input video signal, and then, sequentially writes the input video signal into image memory 302. Timing generating circuit 403 generates timing signals necessary for various kinds of processing by video processing circuit 405 based on the vertical synchronizing signal 4b and the clock from clock generating circuit 402, supplies the same to video processing circuit 405, generates a timing signal for writing the video signal into image memory 302 and supplies the same to image memory 302.

The processings (for example, a period of each kind of signal) of each of clock generating circuit 402, timing generating circuit 403 and video processing circuit 405 are appropriately changed so as to be suitable for processing of the input video signal by the format identifying information 4a from format determining unit 305 of FIG. 3.

As stated above, video processing and write processing unit 301 appropriately processes the effective display region of the input video signal in the twodimensional space so as to be adapted for the two-dimensional data arrangement of image memory 302 based on the format identifying information and writes the same into image memory 302.

Figure 5:
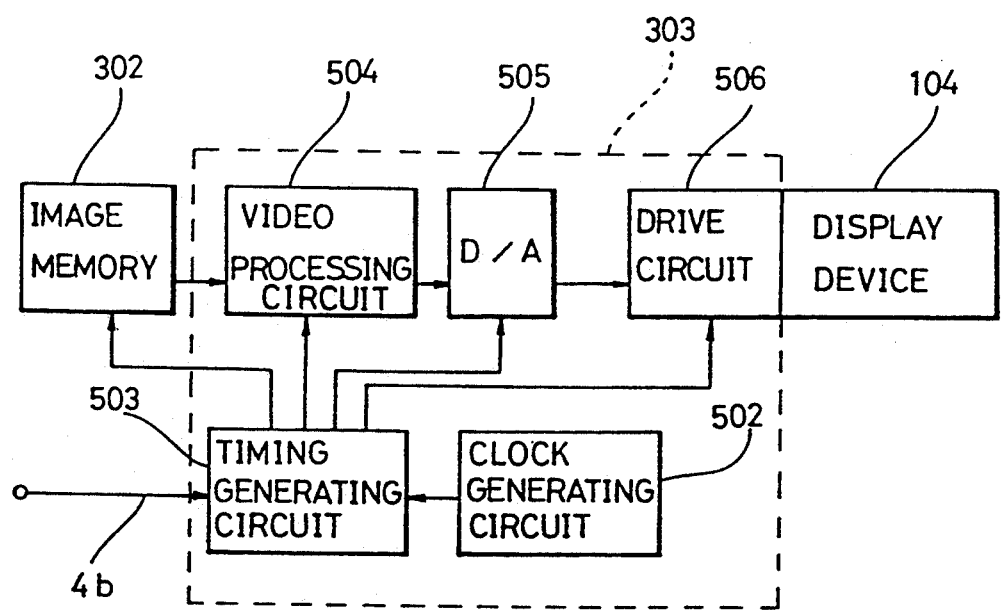
FIG. 5 is a block diagram showing the details of the read and display processing unit shown in FIG. 3.

FIG. 5 is a block diagram showing the details of the read and display processing unit 303 shown in FIG. 3. Referring to FIG. 5, a timing generating circuit 503 generates various kinds of timing signals based on the vertical synchronizing signal 4b supplied from video processing and write processing unit 301 of FIG. 3 and the clock of a prescribed frequency generated by a clock generator circuit 502. Image data of a two-dimensional arrangement is read out from image memory 302 within a fixed period of time T (as described later) based on the timing signal from timing generating circuit 503 and provided to a video processing circuit 504.

Video processing circuit 504 applies a necessary processing to the image data read out from image memory 302 and then supplies the same to a D/A converter 505. This processing includes a processing (so-called inverse matrix operation) in which video components including a luminance signal Y and two color difference signals are converted into video components of R, G, B signals, a nonlinear processing of a video signal level so as to be adapted the same for the display characteristic of display device 104, and so on.

The processed image data is D/A converted by D/A converter 504 and then supplied to a drive circuit 506 for driving display device 104. Drive circuit 506 drives the two-dimensionally arranged pixels of display unit 104 based on the supplied image data and displays a corresponding image. The operations of the above-mentioned video processing circuit 504, D/A converter 505 and drive circuit 506 are performed based on various kinds of timing signals from timing generating circuit 503.

In this case, it is assumed that the period of the display processing by read and display processing unit 304, that is, the period T of the processing of reading from image memory 302, is set shorter than the shortest period T (n) among vertical periods of signals of various kinds of formats acceptable as input video signals. That is, the continuity of time of the input video signal defined by the effective video display period and the blanking period is lost in the display processing stated above. Generally, in a display apparatus having a deflection system such as a CRT display apparatus, the blanking period is also an essential primary factor for determining an effective display region on the screen, and therefore it is essential that the continuity of time of the video signal including the blanking period is held in displaying in order to realize a prescribed effective display region on the screen. In a display device including a fixed two-dimensional pixel arrangement without a deflection system such as an LCD device, however, it is not necessarily required to hold such continuity of time of the video signal.

The frequency of the clock for reading of image memory 302 supplied from timing generating circuit 503 is set to such a fixed value that the two-dimensional data arrangement within image memory 302 can be read out and displayed on display device 104 within the fixed period T stated above. This frequency is determined in consideration of the pixel arrangement, the driving manner, the driving speed and so on of display device 104 in addition to the period T.

FIGS. 6A and 6B are timing charts showing timings of the operations in the embodiment stated above, particularly, a processing of writing the image data into image memory 302 and a processing of reading therefrom.

Firstly, referring to FIG. 6A, video processing and write processing unit 301 of FIG. 4 processes a video signal corresponding to the effective display region and writes the same into image memory 302 within a period T (n) corresponding to the vertical period of the input video signal. Read and display processing unit 303 is triggered by the vertical synchronizing signal and reads out the contents of image memory 302 within a fixed processing period T shorter than T (n).

As stated above, it is possible to perform a process for image display in a fixed manner regardless of the format of the input video signal by performing the writing operation by video processing and write processing unit 301 and the reading operation by read and display processing unit 303 with respect to image memory 302 in an asynchronous manner and by fixing the timing of reading of image memory 302 to an appropriate timing. In other words, the processing way by read and display processing unit 303 is uniquely determined if a driving manner and driving speed of the display device is determined, and is not affected by the format (such as horizontal and vertical periods) of the input video signal.

Furthermore, as the period T for the reading processing of image memory 302 is set shorter than the vertical period T (n) of any input video signal, the reading operation does not get ahead of the writing operation as far as the timings of the start of writing and reading in each period of processing are the same as in FIG. 6A.

However, as the speeds of writing in and reading from the image memory are different from each other as stated above, if the timing of the start of the writing processing relatively deviates from that of the reading processing, there is a possibility that the reading operation gets ahead of the writing operation. In order to prevent such a situation, it is considered that image memory 302 of a storage capacity corresponding to two pages of the screen of the display device is provided for each of the video components (for example R, G, B signals) of the video signal and the memories are adapted to be accessed separately for the writing processing and the reading processing.

As shown in FIG. 6B, however, it is possible to solve the above-mentioned problem with an image memory of a storage capacity corresponding to one page of display screen by delaying the phase of the start of the reading processing with respect to the phase of the start of the writing processing by an appropriate period Td.

Referring to FIG. 6B, suppose the longest period and the shortest period among the vertical periods of the signals of various kinds of formats acceptable as input video signals are T (n) max and T (n) min, respectively, the fixed period for the reading processing is T, and the delay period of the starting phase of the reading processing with respect to the starting phase of the writing processing is Td:T and Td may be set so that the relationship is established as follows:

$$Td + T \leq T(n) \text{ max}$$

$$T \leq T(n) \text{ min.}$$

As stated above, according to one embodiment of the present invention, it is possible to fix the structure and processing way of the display processing system even for a plurality of kinds of input video signals of different formats and remarkably simplify the structure of the video display apparatus itself by utilizing the specific characteristics to a display device having a fixed two-dimensional pixel arrangement that it is unnecessary to hold the continuity of time of the video signal.

Some ways are considered for writing and reading processing of the image memory and the displaying processing of the display device according to the format of the input video signal and the form of the display device.

A description will be specifically made below of the operation of a video display apparatus according to the present invention with the respect to input video signals of several formats where the details of display device 104 is limited.

Suppose that an LCD device is used as display device 104, which is driven in a so-called active matrix system having 1035 lines in the vertical direction, 1000 pixels per horizontal line in the horizontal direction, and an aspect ratio of 9:16.

Additionally, suppose that signals of formats of the kinds shown below are used as acceptable input video signals.

(1) HDTV video signal defined by BTA S-001
The number of scanning lines: 1125
Field frequency: 60 Hz
2:1 interlace scanning
aspect ratio: 9:16

(2) So-called EDTV video signal obtained by sequentially scanning NTSC signals
The number of scanning lines: 525
Field frequency: 59.94 Hz
1:1 non-interlace scanning
aspect ratio:3:4

(3) One example of a computer output video signal
The number of scanning lines:448
Field frequency: 56 Hz
1:1 non-interlace scanning
aspect ratio:3:4

Figure 7:
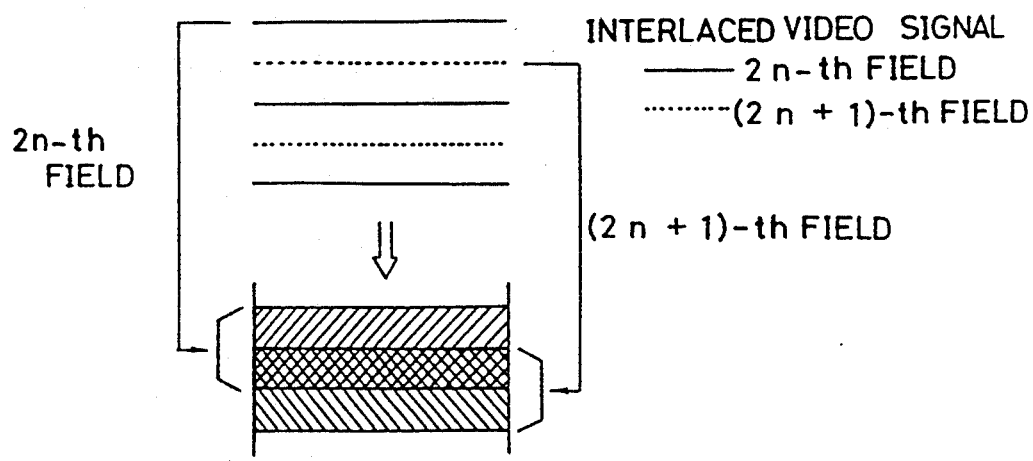
FIG. 7 is a typical diagram for describing a displaying manner of the display device according to one embodiment of the present invention.

A way of displaying in an LCD of the active matrix type is employed in which one line of video signal is simultaneously displayed on two horizontal lines of the LCD and the pair of 2 lines is shifted by 1 line for each field as shown in FIG. 7.

Furthermore, it is assumed that a luminance signal Y and two kinds of color difference signals are employed as components of the input video signals. Then, it is assumed that one image memory for the luminance signal Y and two image memories for the color difference signals, that is, a total of three image memories are employed for display, having a data arrangement corresponding to the two-dimensional pixel arrangement of 518 lines in the vertical direction and 1000 pixels in the horizontal direction in view of the fact that the same image is displayed on the two horizontal lines as stated above.

Figure 8:
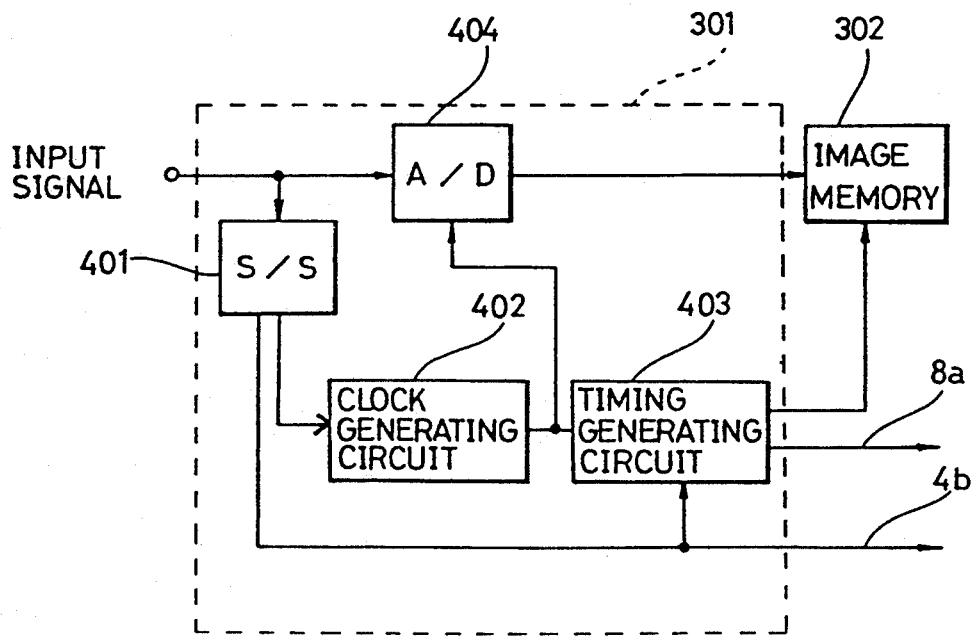
FIG. 8 is a block diagram showing the structure of the video processing and write processing unit when an HDTV signal is provided as an input video signal.

In a case where the HDTV video signal shown in (1) above is supplied, video processing and write processing unit 301 is structured as shown in FIG. 8 in response to the format identifying information 4a from format determining unit 305 (FIG. 3). Since the number of scanning lines and the aspect ratio of this HDTV video signal almost coincide with the number of lines in the vertical direction and the aspect ratio of display device 104, it is unnecessary to perform processing of the video signal before writing into the image memory such as conversion of the number of scanning lines, conversion of the aspect ratio and so on. Accordingly, in the circuit structure shown in FIG. 8, the output of A/D converter 404 *directly written into image memory 302, and processing circuit 405 of FIG. 4 is skipped over.*

Clock generating circuit 402 of FIG. 8 generates a clock phase-synchronized with the horizontal synchronizing signal extracted in synchronization separation circuit 401 for dividing the horizontal effective display period of the video signal into 1000 periods.

In this case, it is assumed that the number of pixels corresponding to the horizontal and vertical blanking periods are ma and na, respectively, image data of the math and subsequent effective display pixels (1000 pixels) counting from the horizontal synchronization signal is sequentially written into a corresponding position of the two-dimensional data arrangement of image memory 302 for each of the na-th and subsequent effective display lines counting from the vertical synchronizing signal.

In practice, the HDTV video signal is a signal interlaced and in displaying, as stated above, the pair of the two lines simultaneously displaying the same video information is shifted for each field, so that there is a possibility that the order of the lines is changed while displaying. In order to prevent this, in the embodiment of FIG. 8, timing generating circuit 403 generates a signal 8a defining whether the present field is an even-numbered field or an odd-numbered field, and supplies the signal 8a to read and display processing unit 303.

Figure 9:
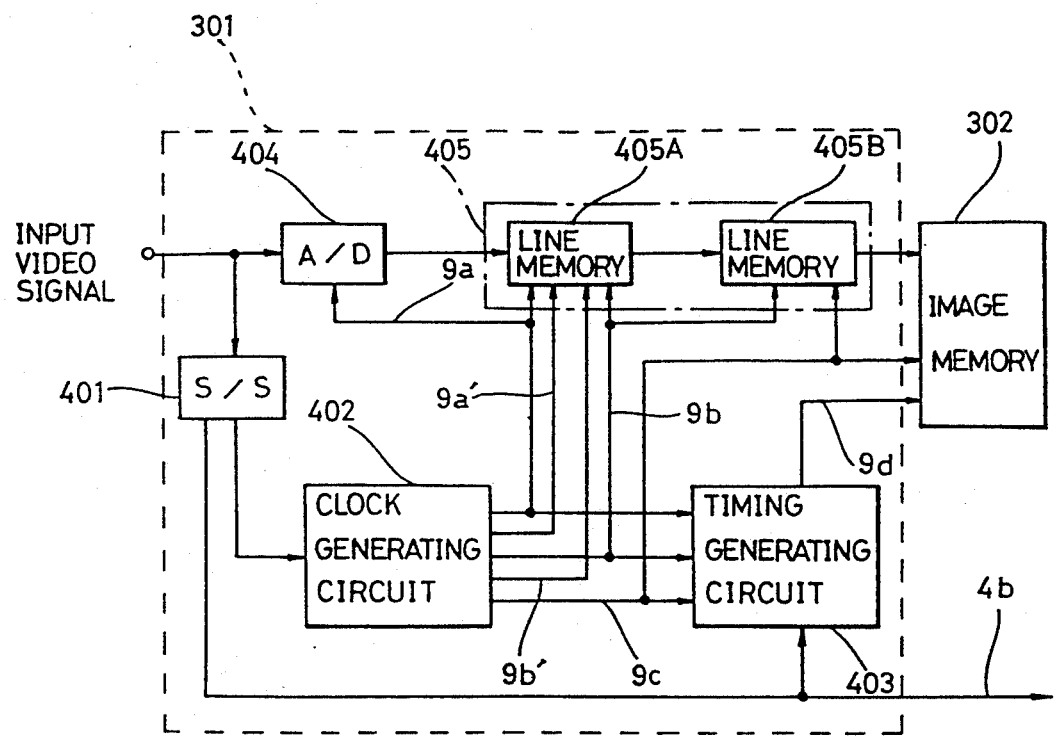
FIG. 9 is a block diagram showing the structure of the video processing and write processing unit when an EDTV signal is provided as an input video signal.

In a case where the EDTV video signal shown in (2) above is provided, video processing and write processing unit 301 is structured as shown in FIG. 9, in response to the format identifying information 4a from format determining unit 305. The number of scanning lines and the aspect ratio of the EDTV video signal do not coincide with the number of lines in the vertical direction and the aspect ratio of display device 104. Accordingly, there are some possible configurations in which an image of an aspect ratio 3:4 is displayed in a two-dimensional display region of display device 104 having the aspect ratio of 9:16.

Figure 10:
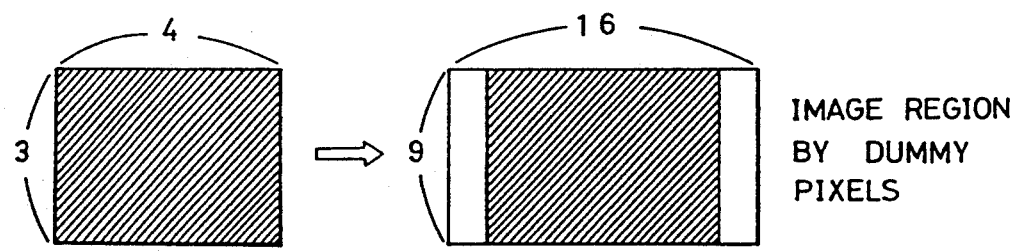
FIG. 10 is a typical diagram showing an effective display region by the EDTV signal.

In this case, consider a case where the effective display region (the portion with oblique lines) fully occupies the display region of the display device in the vertical direction and has an aspect ratio of 3:4 as shown in FIG. 10.

Firstly, as the number of effective scanning lines of the EDTV video signal to be displayed does not coincide with the number of pixels of display device 104 in the vertical direction, a process of converting the number of scanning lines is performed by processing circuit 405 after the A/D conversion of the input video signal. That is, the number of effective scanning lines of the EDTV signal, about 480 lines/field is increased to about 1034/2 =517 lines/field using a line memory 405A. In the circuit of FIG. 9, a signal of 15 lines is generated during a period corresponding to 14 lines of the original input video signal for such an increase in the number of scanning lines, and as a result, the signal of 480 lines/field is converted into a signal of about 514 lines/field.

Clock generating circuit 402 generates a clock 9a of a frequency fa having a the phase synchronous with that of the horizontal synchronizing signal and for dividing the effective display period in the horizontal direction into an appropriate number Na of pixels, supplies the same to A/D converter 404 and line memory 405A, and generates a clock 9b of a frequency fb being 15/14 times the frequency fa of the clock 9a and supplies the same to line memories 405A and 405B. Clock generating circuit 402 further generates horizontal reset signals 9a' and 9b' synchronized with the clocks 9a and 9b, respectively, and supplies the horizontal reset signals 9a' and 9b' to line memory 405A.

The input video signal is sampled in A/D converter 404 in response to the clock 9a and, furthermore, written into line memory 405A for converting the number of scanning lines in response to the clock 9a and the horizontal reset signal 9a'. The video signal once written into line memory 405A is read out therefrom in response to the clock 9b and the horizontal reset signal 9b' asynchronously with the above-mentioned writing process.

Figure 11:
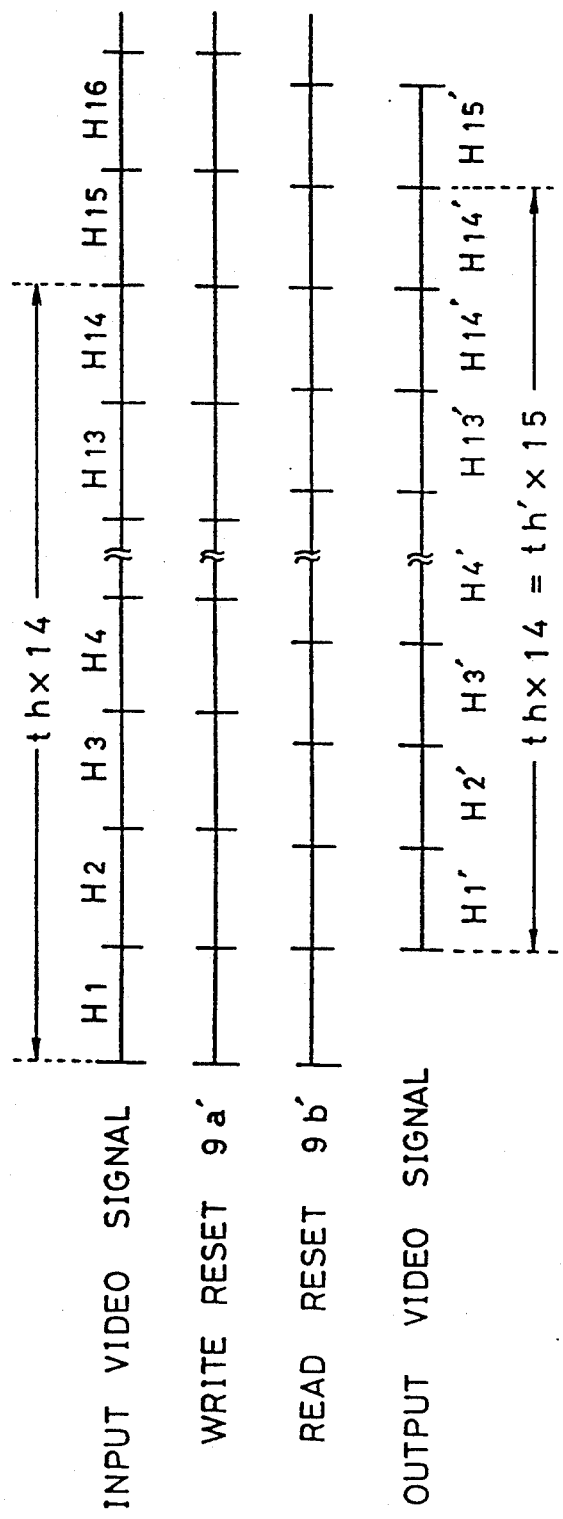
FIG. 11 is a timing chart for describing the operation of the circuit shown in FIG. 9.

FIG. 11 is a timing chart showing such a scanning line number converting process. Here, since the ratio of the periods th, th' of the horizontal reset signals 9a' and 9b' is 15:14, an output video signal of 15 lines obtained by being time-compressed into 14/15 is read out during a period corresponding to 14 lines of the input video signal by the asynchronous writing and reading processings of line memory 405A as stated above as shown in the timing chart of FIG. 11.

In such asynchronous processing, as the conversion of the number of scanning lines is realized by causing the reading processing to get ahead of the writing processing of line memory 405A, it is necessary to prevent the effects by such an operation from appearing in the effective display screen.

Therefore, if such a phase control is performed that the phase of the horizontal reset signal 9a' for writing into the line memory is set to be within the horizontal blanking period and the phase of the horizontal reset signal 9b' for reading coincides with the phase of the writing horizontal reset signal 9a' for every 15 lines, the reading processing gets ahead of the writing processing only in the horizontal blanking period, so that the conversion of the number of scanning lines can be performed without any adverse effect to the display screen due to such passing operation.

In the examples stated above, the conversion of the number of scanning lines is performed by the simple passing operation, and the same signal as the signal of a line immediately before a line to be inserted is employed as a video signal of the 1 line to be added and inserted for every 14 lines of the original input video signal. However, the conversion of the number of scanning lines can be also performed by a so-called linear inserting processing in which an operational processing is applied to a signal of several lines after conversion and the scanning lines are inserted to have a filter characteristic in the vertical direction.

The numbers of pixels of the display image and the display device in the vertical direction coincide with each other by the scanning line number converting process as stated above. In the process above, however, the adjustment of the aspect ratio is not taken into consideration at all.

Now, consider the adjustment of the aspect ratio in the following example. In order to realize an effective display region of an aspect ratio of 3:4 on a display device of an aspect ratio of 9:16 in the manner shown in FIG. 10, with the conversion of the number of scanning lines, the video signal is time-compressed in the horizontal direction and the effective display region in the horizontal direction is converted into a region corresponding to 750 pixels, that is, about ¾ of the number of pixels in the horizontal direction, i.e., 1000, of display device 104.

For this process, such a frequency that the number Na of pixels in the effective display period in the horizontal direction is about 750 is set as a frequency of the above-mentioned writing clock 9a. Then, the video signal read out from line memory 405A and having the number of scanning lines converted is written into another line memory 405B for converting an aspect ratio in response to the clock 9b. The video signal is time-compressed into ¾ in the horizontal direction and supplied as a video signal of an effective display region corresponding to 750 pixels by reading out the video signal once written into line memory 405B from line memory 405B in response to a clock 9c of a frequency fc being 4/3 of the frequency fb of the clock 9b supplied from clock generating circuit 402. Then, an appropriate number of dummy pixels are added before and after the video signal of 750 pixels, which causes the number of pixels of 1 horizontal line to be 1000, and are then sequentially written into image memory 302.

Writing of the video signal into image memory 302 is started from an appropriate effective line and effective pixels counting from the horizontal and vertical synchronizing signals in the same way as in the case of the HDTV signal of (1) stated above. For this purpose, a timing signal 9d indicating the start timing of the operation of writing into memory 302 is supplied to image memory 302 from timing generating circuit 403.

With the processings described above, an image by the EDTV signal is written into the two-dimensional data arrangement of image memory 302, which fully occupies the number of pixels in the vertical direction and keeps the aspect ratio of 3:4.

Next, in a case of writing of the image output of the computer shown in (3) indicated above, if the display configuration of the image is the same as in the case of the EDTV signal of (2) above, basically, writing of a video signal into the image memory can be realized in the same manner as in the writing process of the EDTV signal. For example, assuming that the effective scanning line number of the image output of the computer is about 420 lines/field, the converting process of the number of scanning lines may be performed so that 5 lines of the video signal are generated from 4 lines of the signal.

The differences between the computer image output signal and the EDTV signal of (2), are (i) that the clock frequencies fa, fb and fc are different from those in the EDTV signal as the horizontal periods of the both signals are different from each other and (ii) that the ratio of the clock frequencies fa and fb is different from that in the EDTV signal due to the difference of the number of scanning lines to be converted.

When such a processing is performed, the effective scanning line number after the conversion of the number of scanning lines does not completely coincide with the number of vertical pixels of the display device. Generally, however, several percents in the horizontal and vertical directions are masked in displaying in the display region, so that an error within a certain range does not become a serious problem in practice.

In each case of (1) to (3) stated above, the scanning line number converting process of the video signal is performed so as to form an effective display region fully in the vertical direction of the two-dimensional pixel arrangement of the display device. However, it is also possible to realize such a display configuration that dummy pixels are also provided in the vertical direction without converting the number of scanning lines.

Figure 12:
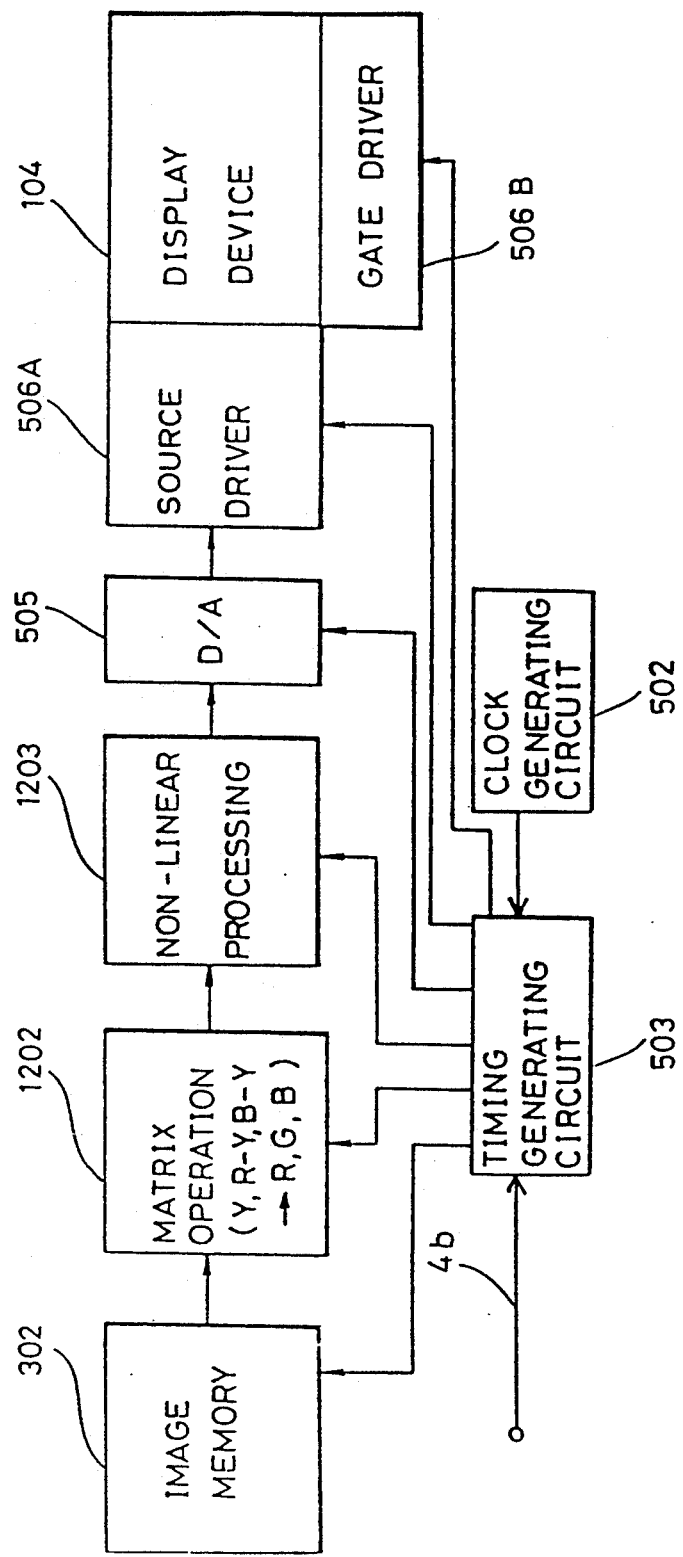
FIG. 12 is a block diagram showing the structure of a read and display processing unit according to another embodiment of the present invention.

FIG. 12 is a block diagram showing the structure of read and display processing unit 303 for displaying the information read out from image memory 302 according to an embodiment the present invention.

The video signal read out from image memory 302 is supplied to an inverse matrix operation circuit 1202. The inverse matrix operation circuit 1202 converts a luminance signal Y and two kinds of color difference signals R-Y, B-Y constituting the supplied video signal into R, G, B signals.

The R, G, B signals obtained by the conversion are provided to a non-linear processing circuit 1203 and a non-linear processing is applied to the R, G, B signals. Originally, a non-linear processing is applied to the video signal in consideration of the gamma characteristics of the CRT. However, as the display characteristics in an LCD display device are different from the gamma characteristics of the CRT, it is necessary to convert the non-linear characteristics of the video signal into non-linear characteristics adapted for the display characteristics of the LCD device. Such a non-linear processing is realized, for example, by using a look up table stored in a ROM (not shown).

The R, G, B signals supplied from non-linear processing circuit 1203 are D/A converted by D/A converter 505 and then provided to a source driver 506A for driving display device 104. A gate signal for selecting an effective display line is separately provided to a gate driver 506B of LCD display device 104. The two-dimensional pixel arrangement formed in a matrix is selected by source driver 506A and gate driver 506B and a corresponding image is displayed on the display device 104.

The display device 104 is not limited to an LCD device and the present invention is also applicable as far as it is a display device of a two-dimensional pixel arrangement having no deflection system.

As stated above, in accordance with the embodiment of the present invention, when the apparatus is structured so that writing of a video signal into an image memory capable of constituting an arrangement equivalent to the fixed two-dimensional pixel arrangement of the display device, and reading therefrom are performed asynchronously, for administering the process time of both of them, in a writing process into the image memory, it is only necessary to consider how an effective display region should be located within the two-dimensional arrangement of the image memory without taking into consideration the driving system of the display device. Therefore, it is also possible to change the display configuration on the display device and to increase the number of formats of the input video signals without affecting the display processing system only by changing or adding a write processing system.

In reading from the image memory, it is only required to simply perform a process where the image data of the image memory is transferred to a corresponding two-dimensional arrangement of the display device within a certain fixed period. Accordingly, it becomes possible to perform a process for reading and displaying in a fixed manner regardless of the format of the input video signal as well as to employ a clock of a stable fixed frequency as a clock of the reading and displaying system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display apparatus comprising:
   a display device having a fixed two-dimensional pixel arrangement;
   an image memory capable of storing a video signal with a two-dimensional arrangement corresponding the two-dimensional pixel arrangement of said display device and capable of asynchronous writing and reading operations;
   receiving means for selectively receiving a video signal to be displayed among video signals of a plurality of formats;
   extracting means for extracting horizontal and vertical synchronizing signals from said received video signal;
   first clock generating means for generating at least one kind of clock having a phase synchronous with that of said extracted horizontal synchronizing signal and having a frequency selected according to the format of said received video signal;
   processing and writing means for processing said received video signal in response to said clock and writing said video signal into said image memory so as to place an effective display region of said video signal within the two-dimensional pixel arrangement of said image memory;
   second clock generating means for generating a clock of a fixed frequency;
   reading means triggered by said extracted vertical synchronizing signal for reading the contents of said image memory within a fixed period in response to the clock of said fixed frequency asynchronously with the writing operation, said fixed period in which the contents of said image memory are read out is set shorter than the shortest one among the vertical periods of said video signals of the plurality of formats; and
   driving means for driving the display device so as to display an image on the two-dimensional pixel arrangement of said display device according to said read contents of the image memory.

2. The video display apparatus according to claim 1, wherein said image memory has an arrangement and storage capacity corresponding to said two-dimensional pixel arrangement for each video component constituting each video signal.

3. The video display apparatus according to claim 1, wherein the relative phase relationship of the start between the asynchronous writing and reading operations of said image memory is fixed.

4. The video display apparatus according to claim 1, further comprising format determining means for determining the format of the received video signal.

5. The video display apparatus according to claim 4, wherein said processing and writing means includes means for writing said received video signal directly into said image memory according to the result of the determination by said format determining means.

6. The video display apparatus according to claim 4, wherein said processing and writing means includes means for performing scanning line number conversion and time-base companding in the horizontal direction of said received video signal according to the result of the determination by said format determining means.

7. The video display apparatus according to claim 6, wherein said conversion of the number of scanning lines and time-base companding in the horizontal direction are performed by writing and reading the video signal into/from a line memory using a plurality of clocks having periods of a prescribed ratio.

8. The video display apparatus according to claim 1, wherein said reading means includes means for applying a fixed signal processing to the video signal read from said image memory.

9. The video display apparatus according to claim 1, wherein said display device comprises an LCD device.

10. The video display apparatus according to claim 9, wherein said LCD device comprises an LCD device of an active matrix type.

11. A video display apparatus comprising:
    a display device having a fixed two-dimensional pixel arrangement;
    an image memory capable of storing a video signal with a two-dimensional arrangement corresponding to the two-dimensional pixel arrangement of said display device and capable of asynchronous writing and reading operations;
    receiving means for selectively receiving a video signal to be displayed among video signals of a plurality of formats;
    extracting means for extracting horizontal and vertical synchronizing signals from said received video signal;
    first clock generating means for generating at least one kind of clock having the phase synchronous with that of said extracted horizontal synchronizing signal and having a frequency selected according to the format of said received video signal;
    processing and writing means for processing said received video signal in response to said clock and writing said video signal into said image memory so as to place an effective display region of said video signal within the two-dimensional pixel arrangement of said image memory;
    second clock generating means for generating a clock of a fixed frequency;
    reading means triggered by said extracted vertical synchronizing signal for reading the contents of said image memory within a fixed period in response to the clock of said fixed frequency asynchronously with the writing operation, said reading means including applying means for applying a fixed signal processing to the video signal read from said image memory; and driving means for driving the display device so as to display an image on the two-dimensional pixel arrangement of said display device according to said read contents of the image memory.

12. A method for displaying video signals of a plurality of formats on a display device having a fixed two-dimensional pixel arrangement, comprising the steps of:
(a) storing a video signal with a two-dimensional arrangement corresponding to the two-dimensional pixel arrangement of the display device in an image memory which is capable of asynchronous writing and reading operations;
(b) selectively receiving a video signal to be displayed from among the video signals of the plurality of formats;
(c) extracting horizontal and vertical synchronizing signals from said video signal received at said step (b);
(d) generating at least one kind of clock having a phase synchronous with that of said horizontal synchronizing signal extracted at said step (c) and having a frequency selected according to the format of said video signal received at said step (b);
(e) processing said video signal received at said step (b) in response to said clock generated at said step (d);
(f) writing said video signal processed at said step (e) into said image memory so as to place an effective display region of said video signal within the two-dimensional pixel arrangement of said image memory;
(g) generating a clock of a fixed frequency;
(h) reading the contents of said image memory, triggered by said vertical synchronizing signal extracted at said step (c), within a fixed period in response tot he clock of said fixed frequency asynchronously with the writing operation;
(i) setting said fixed period in which the contents of said image memory are read out shorter than the shortest one among the vertical periods of the video signals of the plurality of formats; and
(j) driving the display device so as to display an image on the two-dimensional pixel arrangement of the display device according to the contents read out of said image memory.

13. The method for displaying video signals according to claim 12, wherein said image memory has an arrangement and storage capacity corresponding to the two-dimensional pixel arrangement for each video component constituting each video signal.

14. The method for displaying video signals according to claim 13, further comprising the step of fixing the relative phase relationship of the start between the asynchronous writing and reading operations of said image memory.

15. The method for displaying video signals according to claim 12, further comprising the step of determining the format of said video signal received at said step (b).

16. The method for displaying video signals according to claim 15, wherein said step (f) further includes the step of writing said video signal received at said step (b) into said image memory according to the result of said step of determining the format of said video signal received at said step (b).

17. The method for displaying video signals according to claim 15, wherein said step (f) further includes the step of performing scanning line number conversion and time-base companding in the horizontal direction of said video signal received at said step (b) according to the result of said step of determining the format of said video signal received at said step (b).

18. The method for displaying video signals according to claim 17, wherein the conversion of the number of scanning lines and time-base companding in the horizontal direction are performed by writing and reading the video signal into and from a line memory using a plurality of clocks having periods of a prescribed ratio.

19. The method for displaying video signals according to claim 12, wherein the display device comprises an LCD device.

20. A method for displaying video signals of a plurality of formats on a display device having a fixed two-dimensional pixel arrangement, comprising the steps of:
(a) storing a video signal with a two-dimensional arrangement corresponding to the two-dimensional pixel arrangement of the display device in an image memory which is capable of asynchronous writing and reading operations;
(b) selectively receiving a video signal to be displayed from among the video signals of the plurality of formats;
(c) extracting horizontal and vertical synchronizing signals from said video signal received at said step (b);
(d) generating at least one kind of clock having a phase synchronous with that of said horizontal synchronizing signal extracted at said step (c) and having a frequency selected according to the format of said video signal received at said step (b);
(e) processing said video signal received at said step (b) in response to said clock generated at said step (d);
(f) writing said video signal processed at said step (e) into said image memory so as to place an effective display region of said video signal within the two-dimensional pixel arrangement of said image memory;
(g) generating a clock of a fixed frequency;
(h) reading the contents of said image memory, triggered by said vertical synchronizing signal extracted at said step (c), within a fixed period in response to the clock of said fixed frequency asynchronously with the writing operation;
(i) applying a fixed signal processing to the video signal read from said image memory; and
(j) driving the display device so as to display an image on the two-dimensional pixel arrangement of the display device according to the contents read out of said image memory.

* * * * *